US012766714B2

(12) United States Patent
Matsuda

(10) Patent No.: US 12,766,714 B2
(45) Date of Patent: Oct. 20, 2026

(54) INFORMATION PROCESSING APPARATUS, INFORMATION PROCESSING METHOD, AND PROGRAM

(71) Applicant: Sony Group Corporation, Tokyo (JP)

(72) Inventor: Yasuhiro Matsuda, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 551 days.

(21) Appl. No.: 18/251,552

(22) PCT Filed: Oct. 27, 2021

(86) PCT No.: PCT/JP2021/039595
§ 371 (c)(1),
(2) Date: May 3, 2023

(87) PCT Pub. No.: WO2022/102403
PCT Pub. Date: May 19, 2022

(65) Prior Publication Data

US 2024/0100695 A1 Mar. 28, 2024

(30) Foreign Application Priority Data

Nov. 10, 2020 (JP) ................................ 2020-187022

(51) Int. Cl.
*B25J 15/08* (2006.01)
*B25J 9/16* (2006.01)

(52) U.S. Cl.
CPC ............ *B25J 9/1638* (2013.01); *B25J 15/08* (2013.01)

(58) Field of Classification Search
CPC ........ B25J 9/0087; B25J 9/1612; B25J 9/162; B25J 9/1638; B25J 13/083; B25J 15/08;
(Continued)

(56) References Cited

U.S. PATENT DOCUMENTS 4,621,331 A * 11/1986 Iwata .................... B25J 13/083
414/730
8,538,583 B2 * 9/2013 Kim ...................... B25J 9/1612
700/260

(Continued)

FOREIGN PATENT DOCUMENTS

JP H05-285864 A 11/1993
JP H06-28018 A 2/1994

(Continued)

OTHER PUBLICATIONS

English Translation of JP 2020097073A; Inv: Haruki; Pub. Date: Jun. 2020 (Year: 2020).*

(Continued)

*Primary Examiner* — Joseph C Rodriguez
(74) *Attorney, Agent, or Firm* — XSENSUS LLP

(57) ABSTRACT

The present technology relates to an information processing apparatus, an information processing method, and a program that allow stable grasping of an object.

An information processing apparatus according to the present technology includes a detection unit that detects a slip generated on an object grasped by a grasping part, and a coordinative control unit that controls, according to the slip of the object, movement of a whole body of a robot in coordination, the robot including the grasping part. The coordinative control unit controls movement of each of configurations that constitute the whole body of the robot, the configurations including at least a manipulator part to which the grasping part is attached, and a mobile mechanism of the robot. The present technology can be applied to a mobile manipulator that grasps an object.

17 Claims, 16 Drawing Sheets

(58) Field of Classification Search
CPC ........... G05B 2219/37399; G05B 2219/39507; G05B 2219/39533
See application file for complete search history.

(56) References Cited

U.S. PATENT DOCUMENTS

| | | | | |
|---|---|---|---|---|
| 9,186,791 | B2 * | 11/2015 | Kouno | B25J 5/007 |
| 10,981,272 | B1 * | 4/2021 | Nagarajan | B25J 9/1669 |
| 11,999,051 | B2 * | 6/2024 | Narita | B25J 13/085 |
| 12,128,560 | B2 * | 10/2024 | Sodeyama | B25J 9/1633 |
| 2003/0009259 | A1 * | 1/2003 | Hattori | B62D 57/032 700/245 |
| 2004/0140787 | A1 * | 7/2004 | Okamoto | B25J 9/1612 318/568.21 |
| 2007/0152619 | A1 * | 7/2007 | Sugiyama | B25J 9/1612 700/245 |
| 2007/0239315 | A1 * | 10/2007 | Sato | B25J 9/1612 700/245 |
| 2011/0166709 | A1 * | 7/2011 | Kim | B25J 9/1612 700/260 |
| 2018/0272535 | A1 * | 9/2018 | Ogawa | B25J 13/085 |
| 2019/0001508 | A1 * | 1/2019 | Li | B25J 9/1612 |
| 2019/0077023 | A1 * | 3/2019 | Eto | B25J 13/083 |
| 2020/0164506 | A1 | 5/2020 | Hallock et al. | |
| 2022/0274262 | A1 * | 9/2022 | Nagakari | B25J 13/084 |
| 2024/0075615 | A1 * | 3/2024 | Verma | B25J 9/162 |
| 2024/0300093 | A1 * | 9/2024 | Kobayashi | B25J 13/082 |
| 2025/0135636 | A1 * | 5/2025 | Shaw | B25J 9/1612 |
| 2025/0196333 | A1 * | 6/2025 | Petersen | B25J 9/1612 |

FOREIGN PATENT DOCUMENTS

| | | | |
|---|---|---|---|
| JP | 2006-297542 | A | 11/2006 |
| JP | 2007-098501 | A | 4/2007 |
| JP | 2007-111826 | A | 5/2007 |
| JP | 2009-069028 | A | 4/2009 |
| JP | 2019-018253 | A | 2/2019 |
| JP | 2020-097073 | A | 6/2020 |
| WO | 2014/129110 | A1 | 8/2014 |
| WO | WO-2020071080 | A1 | 4/2020 |

OTHER PUBLICATIONS

International Search Report and Written Opinion mailed on Jan. 18, 2022, received for PCT Application PCT/JP2021/039595, filed on Oct. 27, 2021, 12 pages including English Translation.

* cited by examiner

FIG. 14

| | | |
|---|---|---|
| LEADER | MANIPULATOR PART | MAINTAIN POSTURE |
| | HAND PART | CONTROL GRASPING FORCE SO THAT GRASPED OBJECT DOES NOT SLIP |
| | MOBILE BODY PART | OPERATION PLAN |
| FOLLOWER | MANIPULATOR PART | FOLLOWING MOVEMENT USING SLIP SENSING |
| | HAND PART | MAINTAIN GRASPING FORCE |
| | MOBILE BODY PART | FOLLOWING MOVEMENT USING SLIP SENSING |

INFORMATION PROCESSING APPARATUS, INFORMATION PROCESSING METHOD, AND PROGRAM

CROSS-REFERENCE TO RELATED APPLICATIONS

The present application is based on PCT filing PCT/JP2021/039595, filed Oct. 27, 2021, which claims priority to Japanese Application No. 2020-187022, filed Nov. 10, 2020, the entire contents of each are incorporated herein by reference.

TECHNICAL FIELD

The present technology relates to an information processing apparatus, an information processing method, and a program, and more particularly to an information processing apparatus, an information processing method, and a program that allow stable grasping of an object.

BACKGROUND ART

In recent years, a slip sense detection function that has been researched and developed is often used in a system that controls grasping force for grasping an object. The slip sense detection function is a function of detecting a slip generated on an object grasped by a hand part or the like provided in a manipulator.

For example, Patent Document 1 discloses a slip-sensing system that acquires a pressure distribution of when an object comes into contact with a curved surface of a fingertip and derives a critical amount of grasping force that prevents the object from slipping.

CITATION LIST

Patent Document

Patent Document 1: Japanese Patent Application Laid-Open No. 2006-297542

Patent Document 2: Japanese Patent Application Laid-Open No. 2019-018253

Patent Document 3: Japanese Patent Application Laid-Open No. 2007-111826

Patent Document 4: WO 2014/129110

SUMMARY OF THE INVENTION

Problems to be Solved by the Invention

Incidentally, when a grasped object almost slips off, a human unconsciously moves a whole body thereof in a coordinated manner, such as not only simply increasing grasping force but also changing a posture of an arm to reduce slippage of the object, or moving a foot in a direction in which the object is pulled. Furthermore, a human adaptively adjusts a degree of movement of each part of a whole body thereof depending on a surrounding environment or on own posture.

It is considered that a system such as a robot can also stably grasp an object by coordinating movement of a whole body thereof so as to cancel a slip generated on the object.

The present technology has been developed in view of the above circumstances, and is to allow stable grasping of an object.

Solutions to Problems

An information processing apparatus according to one aspect of the present technology includes a detection unit that detects a slip generated on an object grasped by a grasping part, and a coordinative control unit that controls, according to the slip of the object, movement of a whole body of a robot in coordination, the robot including the grasping part.

In one aspect of the present technology, a slip generated on an object grasped by a grasping part is detected, and, according to the slip of the object, movement of a whole body of a robot is controlled in coordination, the robot including the grasping part.

BRIEF DESCRIPTION OF DRAWINGS

FIG. 14 is a diagram illustrating an example of movement of a leader and a follower.

MODES FOR CARRYING OUT THE INVENTION

Figure 1:
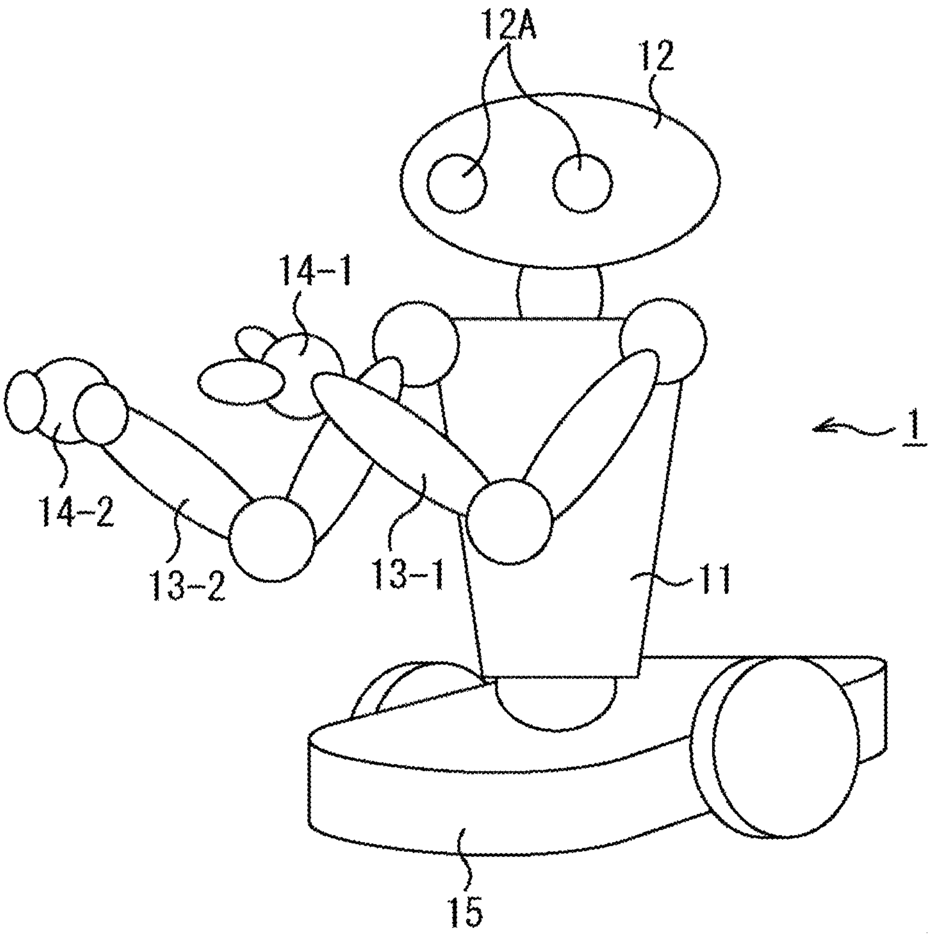
FIG. 1 is a diagram illustrating an example of appearance of a robot according to an embodiment of the present technology.

Hereinafter, an embodiment for carrying out the present technology will be described. The description will be made in the following order.

1. Grasping function of robot
2. Whole-body coordinative control function
3. Configuration of robot
4. Movement of robot
5. Application examples
6. Modifications <<1. Grasping Function of Robot>>

FIG. 1 is a diagram illustrating an example of appearance of a robot 1 according to an embodiment of the present technology.

As illustrated in FIG. 1, the robot 1 is a robot having a humanoid upper body and a mobile mechanism using wheels. A flat sphere-shaped head part 12 is provided on a body part 11. A front surface of the head part 12 is provided with two cameras 12A imitating human eyes.

An upper end of the body part 11 is provided with manipulator parts 13-1, 13-2, which are multi-flexible manipulators. Hand parts 14-1, 14-2 are provided on tip ends of the manipulator parts 13-1, 13-2, respectively. The robot 1 has a function of grasping an object with the hand parts 14-1, 14-2.

Hereinafter, as appropriate, the manipulator parts 13-1, 13-2 will be collectively referred to a manipulator part 13 in a case where the parts are not necessary to be distinguished from each other. Furthermore, the hand parts 14-1, 14-2 will be collectively referred to a hand part 14 in a case where the parts are not necessary to be distinguished from each other. Other configurations provided in pairs will also be described collectively as appropriate.

On a lower end of the body part 11, a mobile body part 15 having a dolly-like shape is provided as a mobile mechanism of the robot 1, The robot 1 can move by rotating the wheels provided on left and right of the mobile body part 15 or by changing a direction of the wheels.

In this manner, the robot 1 is a so-called mobile manipulator capable of movement such as freely lifting or carrying an object while grasping the object by the hand part 14.

Instead of a dual-arm robot as illustrated in FIG. 1, the robot 1 may be configured as a single-arm robot (having one manipulator part 13). Furthermore, leg parts may be provided as a mobile mechanism instead of the mobile body part 15 having a dolly-like shape. In this case, the body part 11 is provided on the leg parts.

Figure 2:
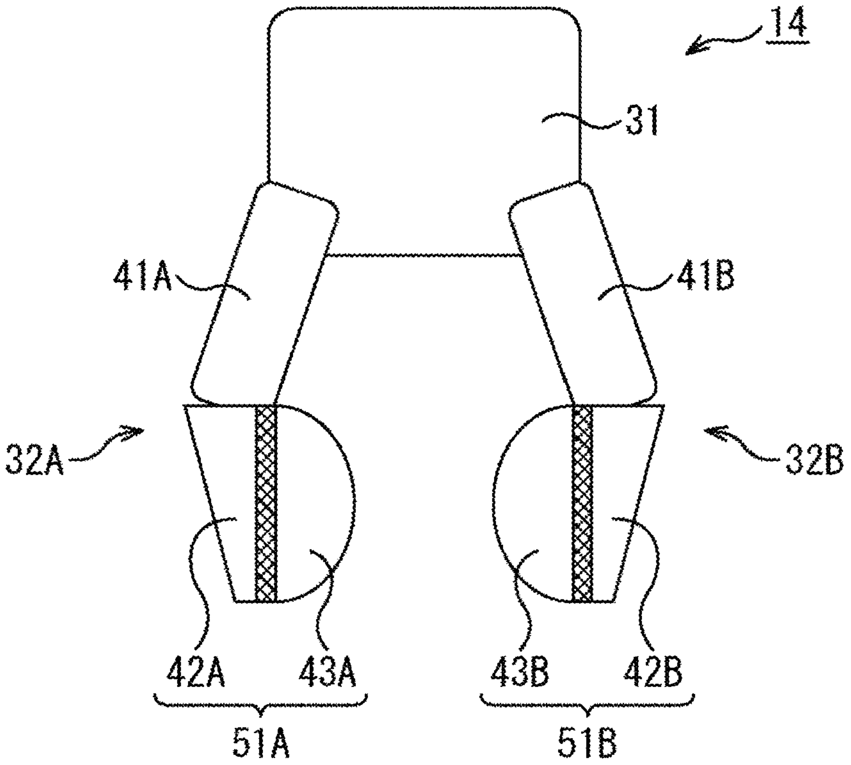
FIG. 2 is an enlarged view of hand parts.

FIG. 2 is an enlarged view of the hand part 14.

As illustrated in FIG. 2, the hand part 14 is a two-fingered gripper-type grasping part. A finger part 32A and a finger part 32B that constitute two fingers are attached to a base part 31. The base part 31 functions as a support part that supports the plurality of finger parts 32.

The finger part 32A is configured by coupling a member 41A, which is a plate-like member having a predetermined thickness, and a member 42A. The member 42A is provided on a tip-end side of the member 41A attached to the base part 31. A coupling part between the base part 31 and the member 41A and a coupling part between the member 41A and the member 42A have respective predetermined motion ranges. Provided on an inner side of the member 42A is a contact part 43A serving as a contact part to come into contact with an object to be grasped. The member 42A and the contact part 43A constitute a fingertip part 51A.

The finger part 32B also has a configuration similar to a configuration of the finger part 32A. A member 42B is provided on a tip-end side of a member 41B attached to the base part 31. A coupling part between the base part 31 and the member 41B and a coupling part between the member 41B and the member 42B have respective predetermined motion ranges. A contact part 43B is provided on an inner side of the member 42B. The member 42B and the contact part 43B constitute a fingertip part 51B.

Note that, although the hand part 14 is described to be a two-fingered grasping part, there may be provided a multi-fingered grasping part having a different number of finger parts, such as a three-fingered grasping part or a five-fingered grasping part.

Figure 3:
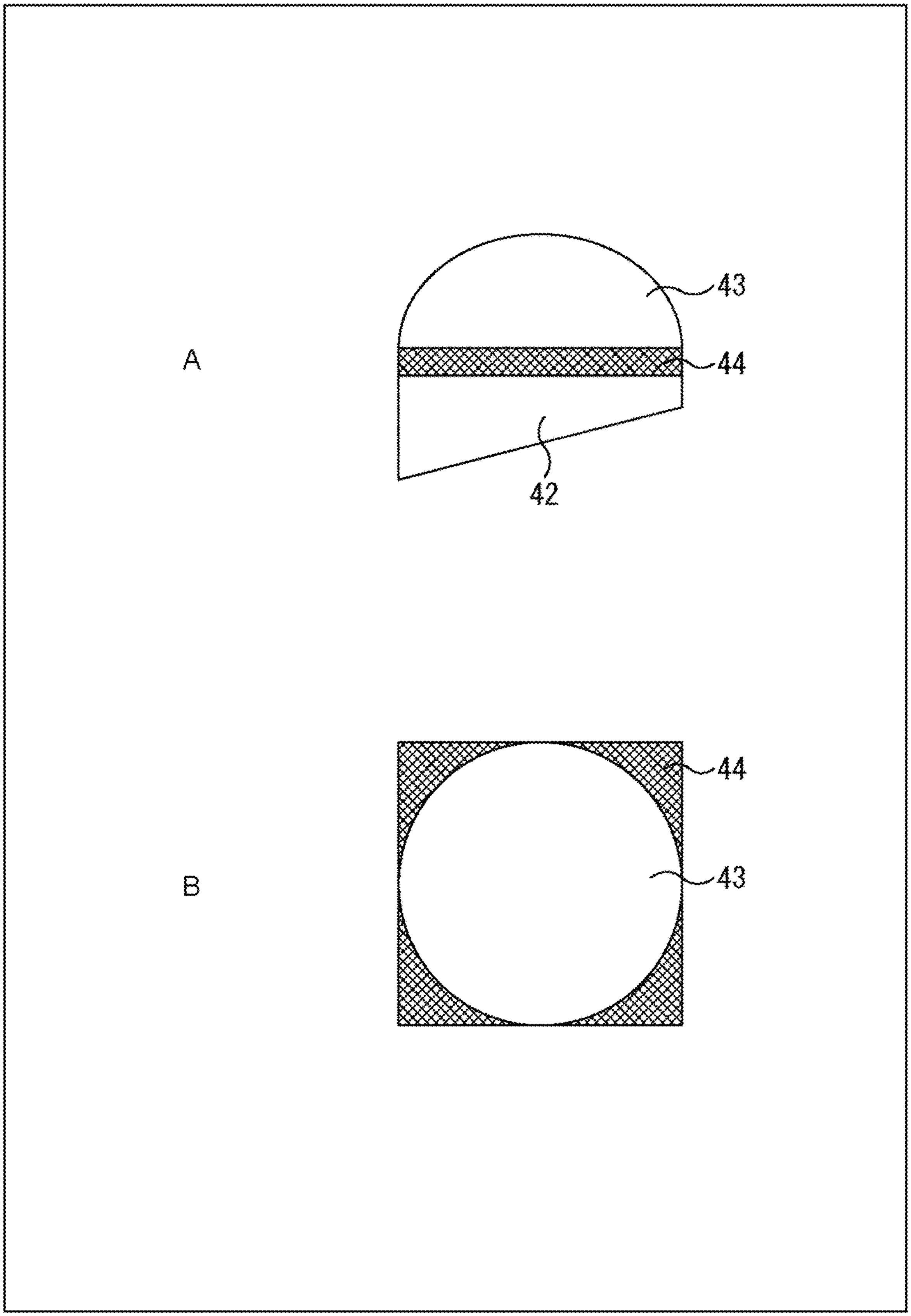
FIG. 3 is an enlarged view illustrating a part of a fingertip part.

FIG. 3 is an enlarged view of a part of a fingertip part 51. A of FIG. 3 illustrates a side surface of the fingertip part 51, and B of FIG. 3 illustrates a front surface (inner surface) of the fingertip part 51.

As indicated by hatched areas, a pressure distribution sensor 44 capable of sensing pressure at each position of the contact part 43 is provided below the contact part 43.

The contact part 43 includes an elastic material such as rubber, and forms a hemispherical flexible deformation layer.

Figure 4:
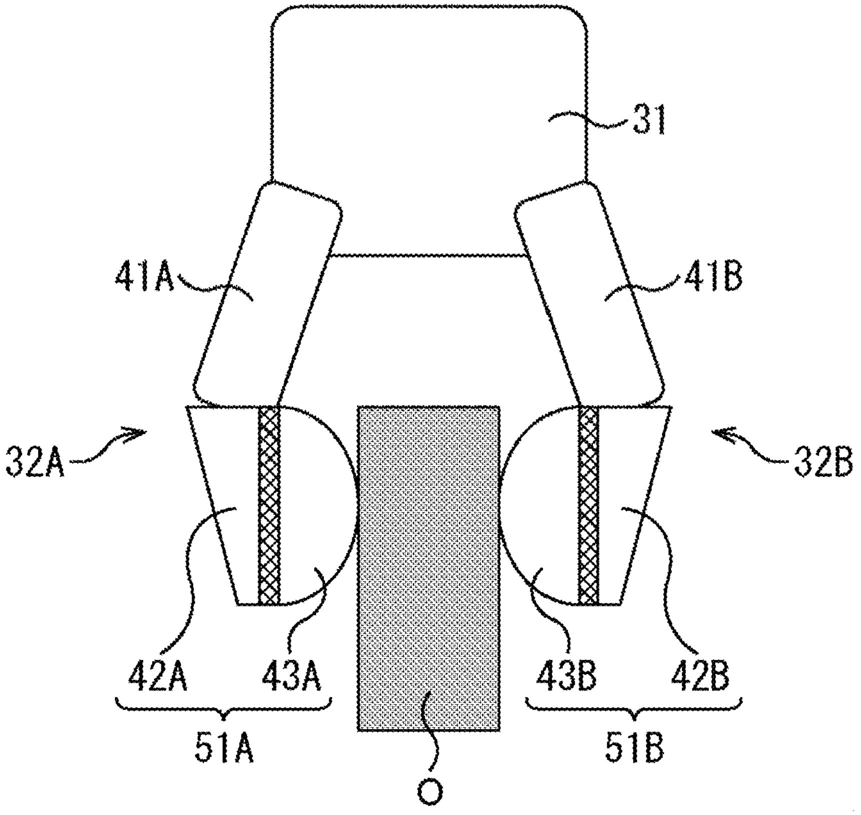
FIG. 4 is a view illustrating a state of grasping by fingertip parts.

The fingertip part 51A and the fingertip part 51B have a parallel link mechanism. The fingertip part 51A and the fingertip part 51B are driven such that the inner surfaces thereof are kept parallel to each other. As illustrated in FIG. 4, an object O which is an object to be grasped is grasped so as to be sandwiched between the contact part 43A on a side close to the fingertip part 51A and the contact part 43B on a side close to the fingertip part 51B, the contact part 43A and the contact part 43B being disposed such that inner surfaces thereof are parallel to each other.

Because the contact part 43 includes an elastic material, the contact part in contact with the object O is deformed according to gravity or the like applied to the object O. In the robot 1, a grasping state of the object is observed on the basis of a result of detection of the pressure distribution by the pressure distribution sensor 44. For example, an amount of displacement of the contact part 43 in a shear direction is measured on the basis of the pressure distribution.

The pressure distribution sensor 44 having the flexible deformation layer formed on a surface thereof functions as a slip sensor that calculates the displacement in the shear direction.

Figure 5:
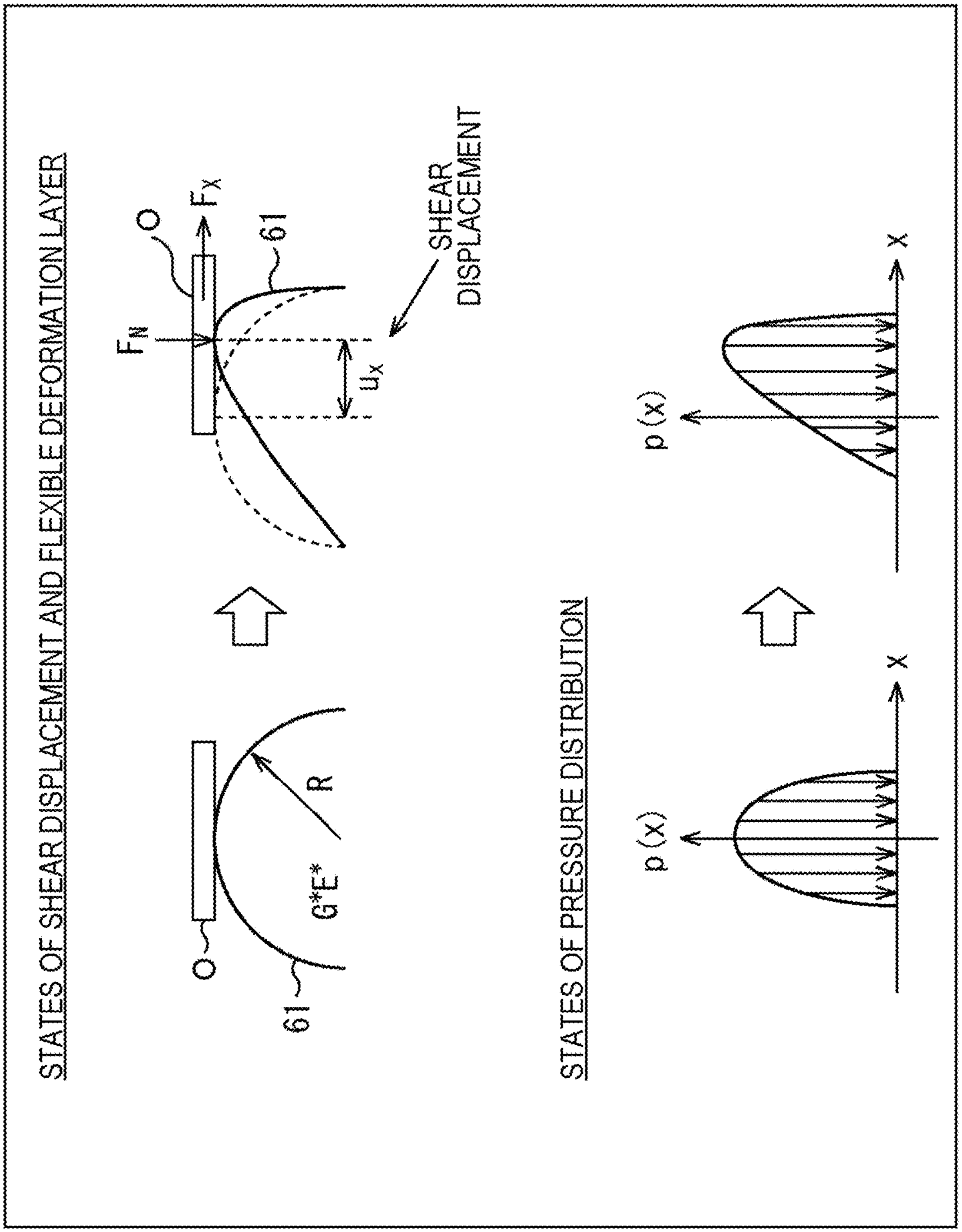
FIG. 5 is a diagram illustrating an example of a method for measuring an amount of displacement of a contact part in a shear direction.

FIG. 5 is a diagram illustrating an example of a method for measuring an amount of displacement of the contact part 43 in the shear direction.

A flexible deformation layer 61 illustrated in FIG. 5 corresponds to the contact part 43 of the hand part 14.

The left side in the upper part of FIG. 5 illustrates a state in which the object O is in contact with the flexible deformation layer 61 in a horizontal direction. Meanwhile, the right side illustrates a state where a normal force $F_N$ is applied to the object O, and shear force $F_x$ serving as force in the horizontal direction is applied.

When the shear force $F_x$ is applied, the flexible deformation layer 61 is deformed in a direction of the shear force $F_x$. A position of a contact point between the object O and the flexible deformation layer 61 moves by a displacement amount $u_x$ from a position before the shear force $F_x$ is applied.

The displacement amount $u_x$ in the shear direction is expressed by the following mathematical formula (1) according to the Hertzian contact theory.

[Mathematical Formula 1]

$$u_x = \frac{f_t}{G*\pi}\left(\frac{3Rf_n}{4E^*}\right)^{-\frac{2}{3}} \tag{1}$$

In Mathematical formula (1), R represents a radius of curvature of the flexible deformation layer 61. G* represents a resultant transverse elastic modulus between the flexible deformation layer 61 and the object O, and E* represents a resultant longitudinal elastic modulus between the flexible deformation layer 61 and the object O.

When the flexible deformation layer 61 is deformed in the shear direction, the pressure distribution of the contact part 43 also changes as illustrated in the lower part of FIG. 5. Therefore, an amount of displacement in the shear direction can be measured by detecting the pressure distribution. For example, the amount of displacement in the shear direction is calculated on the basis of an amount a center of pressure (CoP) moves. The amount of displacement in the shear direction represents an amount the object O slips. Furthermore, the shear direction indicates a direction in which the object O slips.

<<2. Whole-Body Coordinative Control Function>>

The robot 1 includes a whole-body coordinative control function that is a function of coordinating movement of a whole body thereof according to a result of measurement by the slip sensor.

Figure 6:
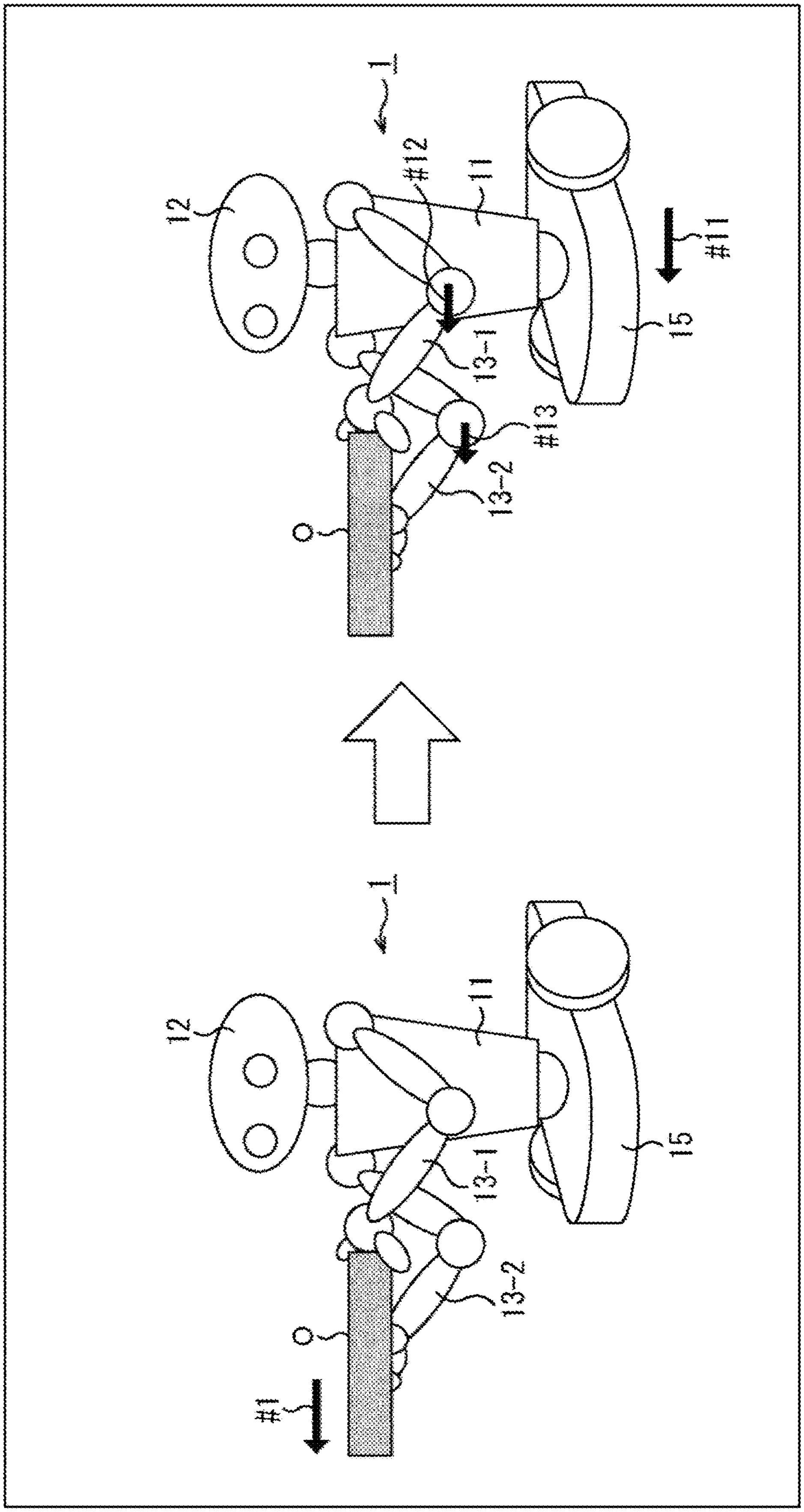
FIG. 6 is a diagram illustrating an example of movement by a whole-body coordinative control function.

FIG. 6 is a diagram illustrating an example of movement by the whole-body coordinative control function.

Whole-body coordinative control by the whole-body coordinative control function is performed when the robot 1 is grasping the object O as illustrated in FIG. 6.

For example, in a case where a slip that shifts leftward as indicated by an arrow #1 on the left side of FIG. 6 is generated on the object O, the robot 1, as indicated on the right side of FIG. 6, operates the mobile body part 15 to move leftward as indicated by an arrow #11, and operates the manipulator parts 13-1, 13-2 to move leftward as indicated by arrows #12, #A13, respectively so as to cancel a slip.

In this manner, the robot 1 controls movement of the whole body to be coordinated according to a state of slip of the object O. Although description will be mainly given assuming that the whole-body coordinative control function controls movement of the manipulator part 13 and mobile body part 15 of the robot 1, another movable component of the robot 1 may also be controlled.

That is, the whole body of the robot 1 includes a configuration other than the manipulator part 13 and the mobile body part 15. For example, movement of a waist part, which is a coupling part between the body part 11 and the mobile body part 15, may be controlled, or movement of the head part 12 may be controlled. Movement of not an entire manipulator part 13 but a part of the manipulator part 13, such as an elbow part or a shoulder part, may be controlled.

Figure 7:
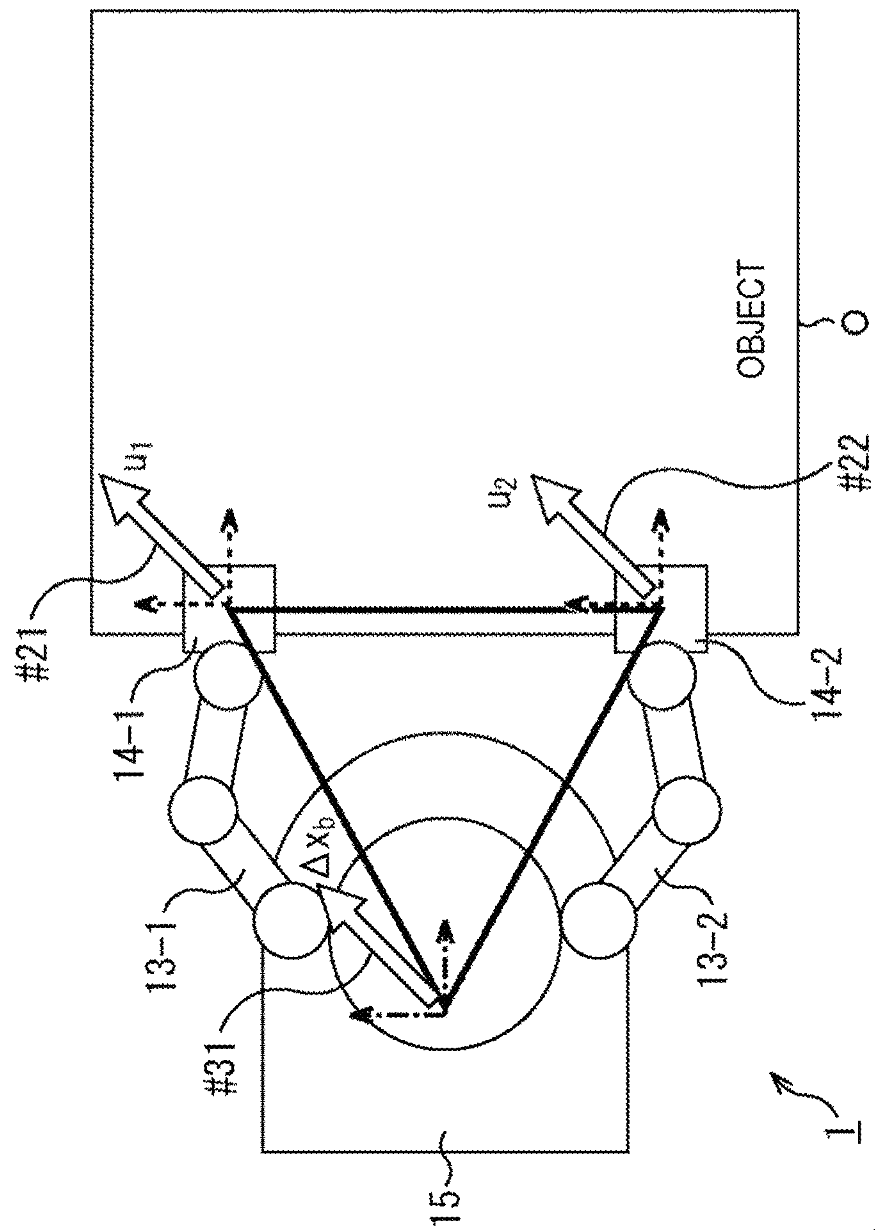
FIG. 7 is a diagram illustrating an example of whole-body coordinative control.

FIG. 7 is a diagram illustrating an example of whole-body coordinative control.

FIG. 7 illustrates a state where the robot 1 grasping a rectangular object O by the hand parts 14-1, 14-2 is viewed from above. Although the hand parts 14-1, 14-2 are illustrated in a rectangular shape for convenience of description, actually, the hand parts 14-1, 14-2 are configured as two-finger gripper-type hand parts as described above.

In a case where a slip is generated on the object O, a displacement amount $u_1$ is measured by a slip sensor of the hand part 14-1 as indicated by an outlined arrow #21. Furthermore, a displacement amount $u_2$ is measured by a slip sensor of the hand part 14-2 as indicated by an outlined arrow #22.

Assuming that $u_i$ represents a displacement amount measured by the slip sensor of the hand part 14 provided on a manipulator part i, a control target value $\Delta x_b$ of the mobile body part 15 is calculated by the following mathematical formula (2). Note that the displacement amount $u_i$ is represented in a hand coordinate system as indicated by broken-line arrows, and the control target value $\Delta x_b$ of the mobile body part 15 is represented in a mobile-body coordinate system as indicated by alternate long and short dash line arrows.

[Mathematical Formula 2]

$$\Delta x_b = w \cdot f(u_1, \ldots, u_n) \tag{2}$$

In Mathematical formula (2), n represents the number of manipulator parts 13 (n=2 in FIG. 7), and w represents a weight. Here, the weight w indicates a proportion of the mobile body part 15 in an amount of control for canceling the slip of the object O. The weight w is determined according to, for example, a priority indicating a degree of preferentially moving the mobile body part 15 in the coordinative control of movement of the whole body.

For example, as priority of the mobile body part 15 is higher, a value representing a larger control amount than an amount of controlling the manipulator part 13 is calculated as the control target value $\Delta x_b$ of the mobile body part 15.

A function $f(u_1, \ldots, u_n)$ used for operation of the control target value $\Delta x_b$ is, for example, a function for obtaining an average value of displacement amounts $u_i$ of all the hand parts 14, the amounts being measured by the slip sensors, as in the following mathematical formula (3).

[Mathematical Formula 3]

$$f(u_1, \ldots, u_n) = \frac{1}{n}\sum_{i=1}^{n} u_i \tag{3}$$

Depending on a way of operation, a function for obtaining a weighted average value or a function for non-linear operation can be used as the function $f(u_l, \ldots, u_n)$.

After the control target value $\Delta x_b$ of the mobile body part 15 is calculated, a control target value $\Delta x_i$ of the manipulator part i is calculated on the basis of the control target value $\Delta x_b$ and the displacement amounts $u_i$ measured by the slip sensors of the respective hand parts 14. A control target value $\Delta x_i$ of the manipulator part i is expressed by the following mathematical formula (4).

[Mathematical Formula 4]

$$\Delta x_i = u_i - \Delta x_b = u_i - w \cdot f(u_1, \ldots, u_n) \tag{4}$$

As indicated by an outlined arrow #31, the robot 1 causes the mobile body part 15 to move by the control target value $\Delta x_b$ so as to cancel the slip of the object. Furthermore, in conjunction with the operation of the mobile body part 15, the robot 1 operates the manipulator part 13-1 by a control target value $\Delta x_1$ and operates the manipulator part 13-2 by a control target value $\Delta x_2$.

As described above, in the robot 1, movement of the whole body including the manipulator part 13 and the mobile body part 15 is controlled according to a slip state represented by the displacement amount $u_i$ measured by the slip sensors. Furthermore, a degree of coordinative control for each part of the whole body is changed by the weight w.

Normally, when a grasped object almost slips off, a human unconsciously moves a whole body thereof in a coordinated manner, such as not only simply increasing grasping force but also changing a posture of an arm to reduce slippage of the object, or moving a foot in a direction in which the object is pulled. Furthermore, a human adaptively adjusts a degree of movement of each part of a whole body thereof depending on a surrounding environment or on own posture. The same movement as the human operation is achieved by the whole-body coordinative control function of the robot 1.

The robot 1 can stably grasp the object O by controlling movement of the whole body thereof so as to cancel the slip of the object O.

<<3. Configuration of Robot>>

<Hardware Configuration>

Figure 8:
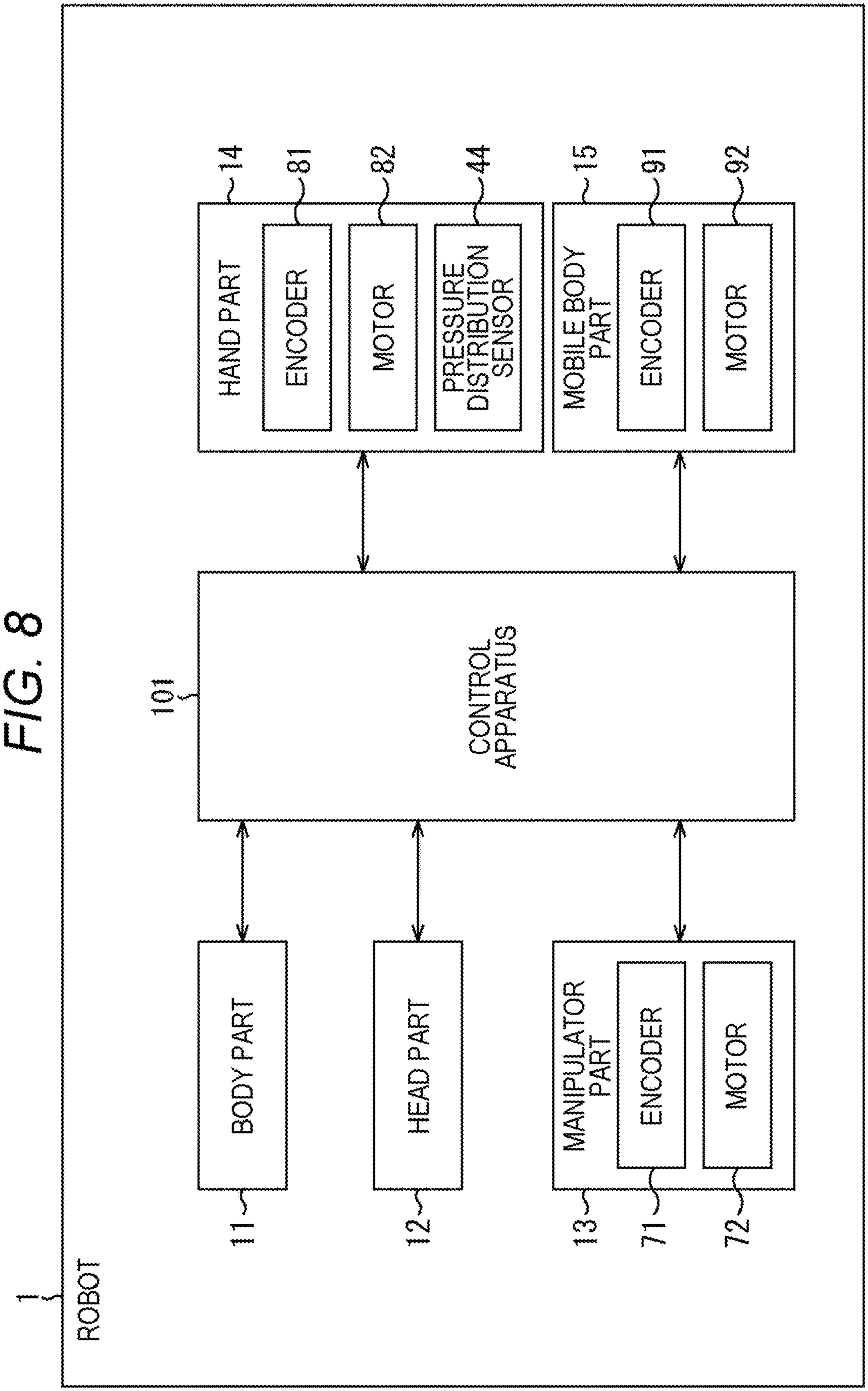
FIG. 8 is a block diagram illustrating a hardware configuration example of a robot.

FIG. 8 is a block diagram illustrating a hardware configuration example of the robot 1.

As illustrated in FIG. 8, the robot 1 includes the body part 11, the head part 12, the manipulator part 13, the hand part 14, and the mobile body part 15 that are connected to a control apparatus 101.

The control apparatus 101 includes a computer including a central processing unit (CPU), a read only memory (ROM), a random access memory (RAM), a flash memory, or the like. The control apparatus 101 is housed, for example, in the body part 11. The control apparatus 101 executes a predetermined program with the CPU to control overall movement of the robot 1.

The control apparatus 101 recognizes an environment around the robot 1 on the basis of a result of detection by a sensor, an image captured by a camera, or the like, and generates an action plan according to a recognition result. The body part 11, the head part 12, the manipulator part 13, the hand part 14, and the mobile body part 15 are provided with various sensors and cameras.

The control apparatus 101 generates a task for achieving a predetermined action, and performs operation on the basis of the generated task. For example, there is performed operation of moving an object by operating the manipulator part 13 while grasping the object, operation of carrying the object by operating the mobile body part 15 while grasping the object, or the like.

Furthermore, the control apparatus 101 performs the whole-body coordinative control according to the displacement amount $u_x$ measured by the slip sensor.

The manipulator part 13 is provided with an encoder 71 and a motor 72. A combination of the encoder 71 and the motor 72 is provided for each joint that constitutes the manipulator part 13.

The encoder 71 detects a rotation amount of the motor 72 and outputs a signal indicating the rotation amount to the control apparatus 101. The motor 72 rotates on an axis of each of the joints. A rotational rate, a rotation amount, and the like of the motor 72 are controlled by the control apparatus 101.

The hand part 14 is provided with an encoder 81, a motor 82, and the pressure distribution sensor 44. A combination of the encoder 81 and the motor 82 is provided for each joint that constitutes the hand part 14.

The encoder 81 detects a rotation amount of the motor 82 and outputs a signal indicating the rotation amount to the control apparatus 101. The motor 82 rotates on an axis of each of the joints. A rotational rate, a rotation amount, and the like of the motor 82 are controlled by the control apparatus 101.

The mobile body part 15 is provided with an encoder 91 and a motor 92.

The encoder 91 detects a rotation amount of the motor 92 and outputs a signal indicating the rotation amount to the control apparatus 101. The motor 92 rotates on axes of the wheels. A rotational rate, a rotation amount, and the like of the motor 92 are controlled by the control apparatus 101.

The body part 11 and the head part 12 are also provided with an encoder and a motor. The encoders provided in the body part 11 and the head part 12 output a signal indicating a rotation amount of the motors to the control apparatus 101. Furthermore, the motors provided in the body part 11 and the head part 12 are driven under control of the control apparatus 101.

<Functional Configuration>

Example of Single Arm

Figure 9:
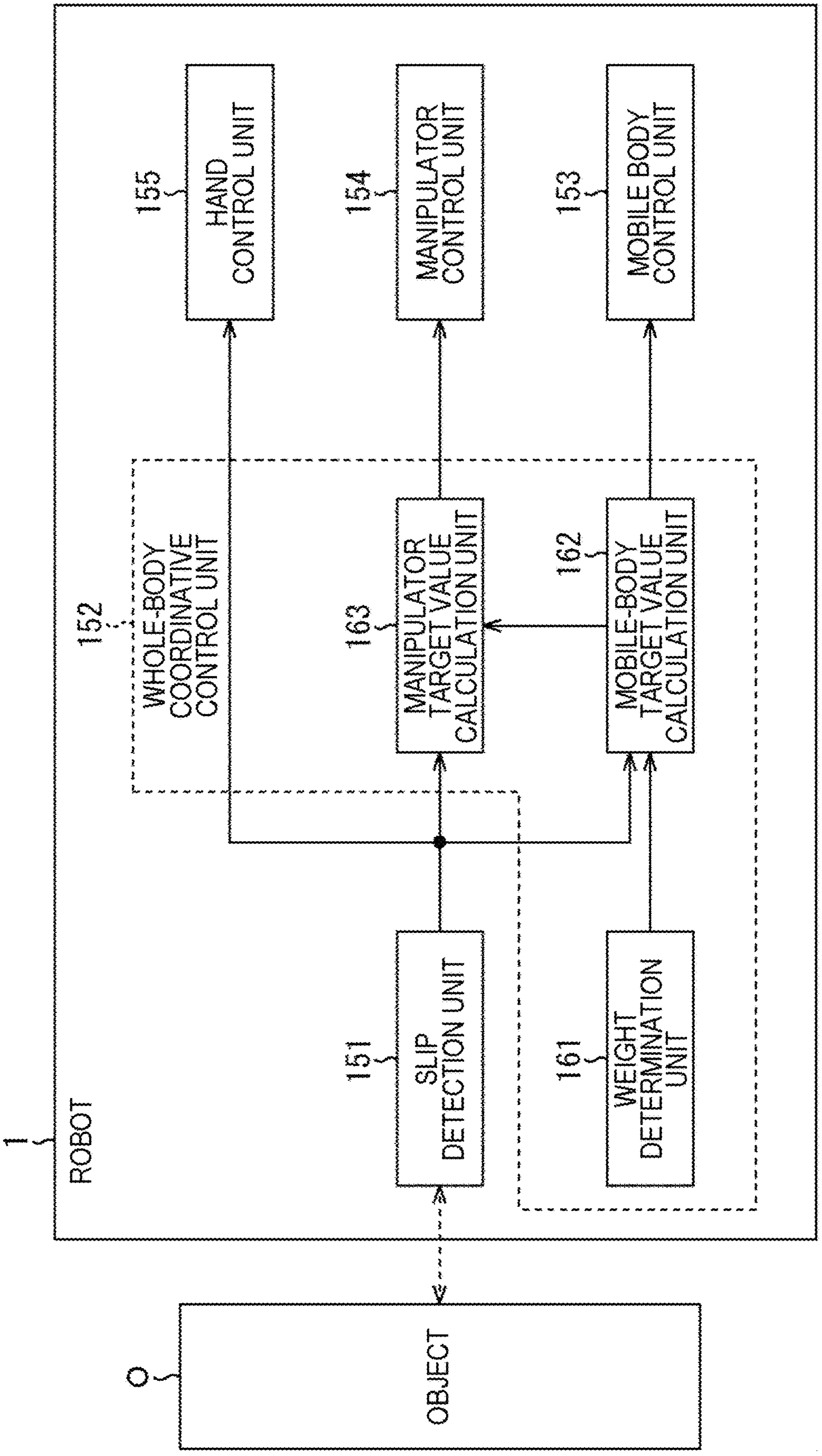
FIG. 9 is a block diagram illustrating a functional configuration example of the robot.

FIG. 9 is a block diagram illustrating a functional configuration example of the robot 1. FIG. 9 illustrates a functional configuration example of a case where the robot 1 is a single-arm robot (a case where only the manipulator part 13-1 is provided).

At least some of the functional units illustrated in FIG. 9 are achieved by the CPU of the control apparatus 101 executing a predetermined program.

As illustrated in FIG. 9, the robot 1 includes a slip detection unit 151, a whole-body coordinative control unit 152, a mobile body control unit 153, a manipulator control unit 154, and a hand control unit 155.

The slip detection unit 151 acquires a pressure distribution represented by sensor data output from the pressure distribution sensor 44 provided in the hand part 14-1, and measures a displacement amount $u_x$ in a shear direction on the basis of the pressure distribution. The displacement amount $u_x$ represents an amount and direction of a slip generated on an object.

The displacement amount $u_x$ measured by the slip detection unit 151 is supplied, as a slip detection result, to a mobile-body target value calculation unit 162 and manipulator target value calculation unit 163 of the whole-body coordinative control unit 152, and the hand control unit 155.

The whole-body coordinative control unit 152 includes a weight determination unit 161, the mobile-body target value calculation unit 162, and the manipulator target value calculation unit 163.

On the basis of information acquired by a sensor or camera provided on each part, the weight determination unit 161 recognizes a state of surroundings of the robot 1, a state of each part of the robot 1, a state of task execution, and the like. The weight determination unit 161 determines the weight w according to a recognized state and outputs the weight w to the mobile-body target value calculation unit 162. Details of how to determine the weight w will be described later.

On the basis of the displacement amount $u_x$ measured by the slip detection unit 151 and the weight w determined by the weight determination unit 161, the mobile-body target value calculation unit 162 performs operation represented by the above mathematical formula (2), and calculates the control target value $\Delta x_b$ of the mobile body part 15. The control target value $\Delta x_b$ calculated by the mobile-body target value calculation unit 162 is supplied to the manipulator target value calculation unit 163 and the mobile body control unit 153.

On the basis of the displacement amount $u_x$ measured by the slip detection unit 151 and the control target value $\Delta x_b$ calculated by the mobile-body target value calculation unit 162, the manipulator target value calculation unit 163 performs operation represented by the above mathematical formula (4), and calculates the control target value $\Delta x_1$ of the manipulator part 13-1. The control target value $\Delta x_1$ calculated by the manipulator target value calculation unit 163 is supplied to the manipulator control unit 154.

The mobile body control unit 153 controls the mobile body part 15 on the basis of the control target value $\Delta x_b$ calculated by the mobile-body target value calculation unit 162.

The manipulator control unit 154 controls the manipulator part 13-1 on the basis of the control target value $\Delta x_1$ calculated by the manipulator target value calculation unit 163.

The hand control unit 155 controls grasping force of the hand part 14-1. The grasping force of the hand part 14-1 is controlled according to the displacement amount $u_x$ measured by the slip detection unit 151, for example.

Example of Dual Arm

Figure 10:
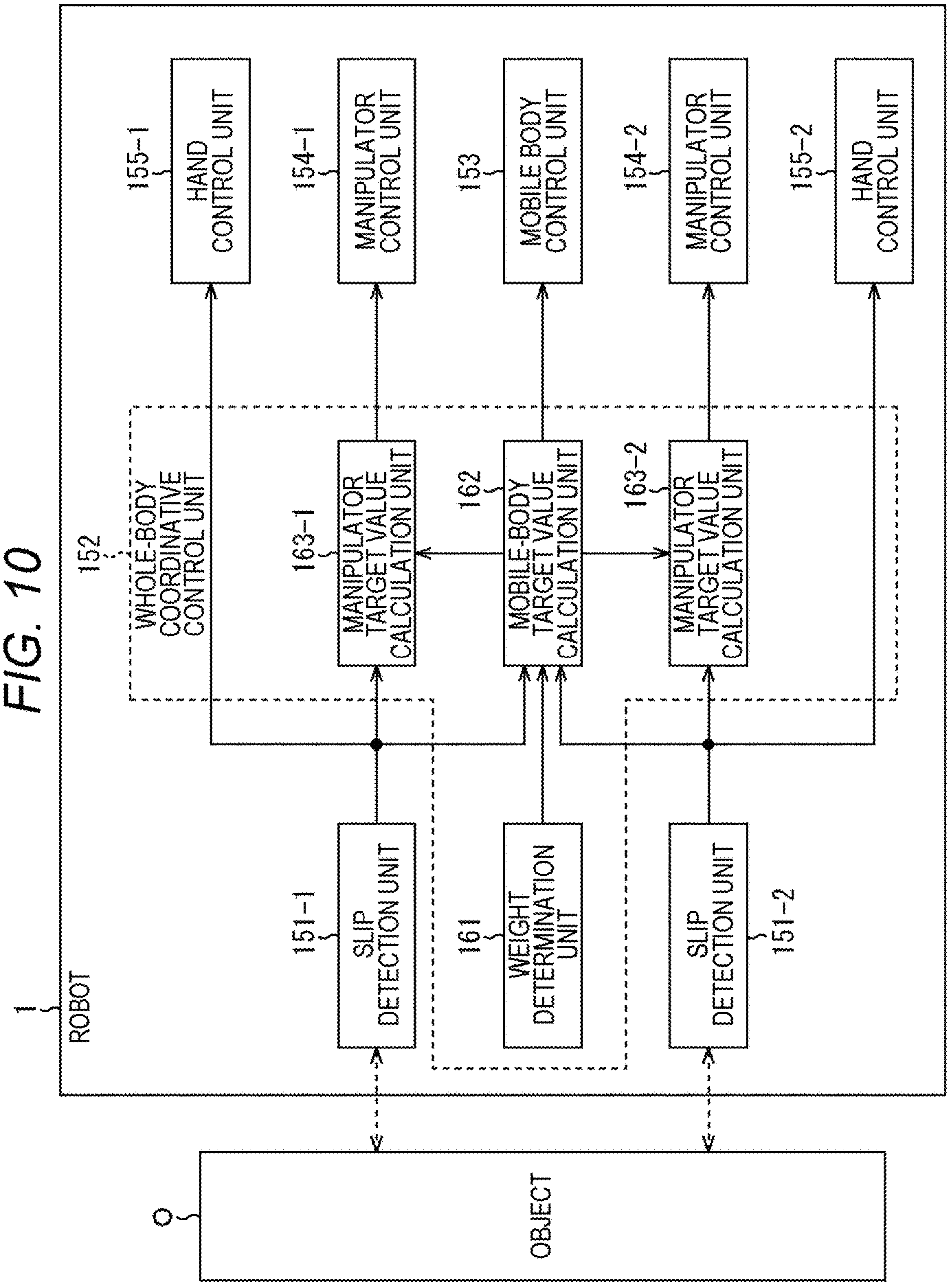
FIG. 10 is a block diagram illustrating another functional configuration example of the robot.

FIG. 10 is a block diagram illustrating another functional configuration example of the robot 1. FIG. 10 illustrates a functional configuration example of a case where the robot 1 is a dual-arm robot (a case where the manipulator parts 13-1, 13-2 are provided).

As illustrated in FIG. 10, the robot 1 includes slip detection units 151-1, 151-2, the whole-body coordinative control unit 152, the mobile body control unit 153, manipulator control units 154-1, 154-2, and hand control units 155-1, 155-2. Description overlapping with the description of FIG. 9 will be appropriately omitted.

The slip detection unit 151-1 acquires a pressure distribution represented by sensor data output from the pressure distribution sensor 44 provided in the hand part 14-1, and measures a displacement amount $u_1$ in a shear direction on the basis of the pressure distribution. The displacement amount $u_1$ measured by the slip detection unit 151-1 is supplied, as a slip detection result, to a mobile-body target value calculation unit 162 and manipulator target value calculation unit 163-1 of the whole-body coordinative control unit 152, and the hand control unit 155-1.

The slip detection unit 151-2 acquires a pressure distribution represented by sensor data output from the pressure distribution sensor 44 provided in the hand part 14-2, and measures a displacement amount $u_2$ in a shear direction on the basis of the pressure distribution. The displacement amount $u_2$ measured by the slip detection unit 151-2 is supplied, as a slip detection result, to the mobile-body target value calculation unit 162 and manipulator target value calculation unit 163-2 of the whole-body coordinative control unit 152, and the hand control unit 155-2.

The whole-body coordinative control unit 152 includes the weight determination unit 161, the mobile-body target value calculation unit 162, and the manipulator target value calculation units 163-1, 163-2.

On the basis of the displacement amount $u_1$ measured by the slip detection unit 151-1, the displacement amount $u_2$ measured by the slip detection unit 151-2, and the weight w determined by the weight determination unit 161, the mobile-body target value calculation unit 162 calculates the control target value $\Delta x_b$ of the mobile body part 15. The control target value $\Delta x_b$ calculated by the mobile-body target value calculation unit 162 is supplied to the manipulator target value calculation units 163-1, 163-2, and the mobile body control unit 153.

On the basis of the displacement amount $u_1$ measured by the slip detection unit 151-1 and the control target value $\Delta x_b$ calculated by the mobile-body target value calculation unit 162, the manipulator target value calculation unit 163-1 calculates the control target value $\Delta x_1$ of the manipulator part 13-1. The control target value $\Delta x_1$ calculated by the manipulator target value calculation unit 163-1 is supplied to the manipulator control unit 154-1.

On the basis of the displacement amount $u_2$ measured by the slip detection unit 151-2 and the control target value $\Delta x_b$ calculated by the mobile-body target value calculation unit 162, the manipulator target value calculation unit 163-2 calculates the control target value $\Delta x_2$ of the manipulator part 13-2. The control target value $\Delta x_2$ calculated by the manipulator target value calculation unit 163-2 is supplied to the manipulator control unit 154-2.

The manipulator control unit 154-1 controls the manipulator part 13-1 on the basis of the control target value $\Delta x_1$ calculated by the manipulator target value calculation unit 163-1.

The hand control unit 155-1 controls grasping force of the hand part 14-1.

The manipulator control unit 154-2 controls the manipulator part 13-2 on the basis of the control target value $\Delta x_2$ calculated by the manipulator target value calculation unit 163-2.

The hand control unit 155-2 controls grasping force of the hand part 14-2.

<<4. Movement of Robot>>

Here, movement of the robot 1 having the above configuration will be described.

Figure 11:
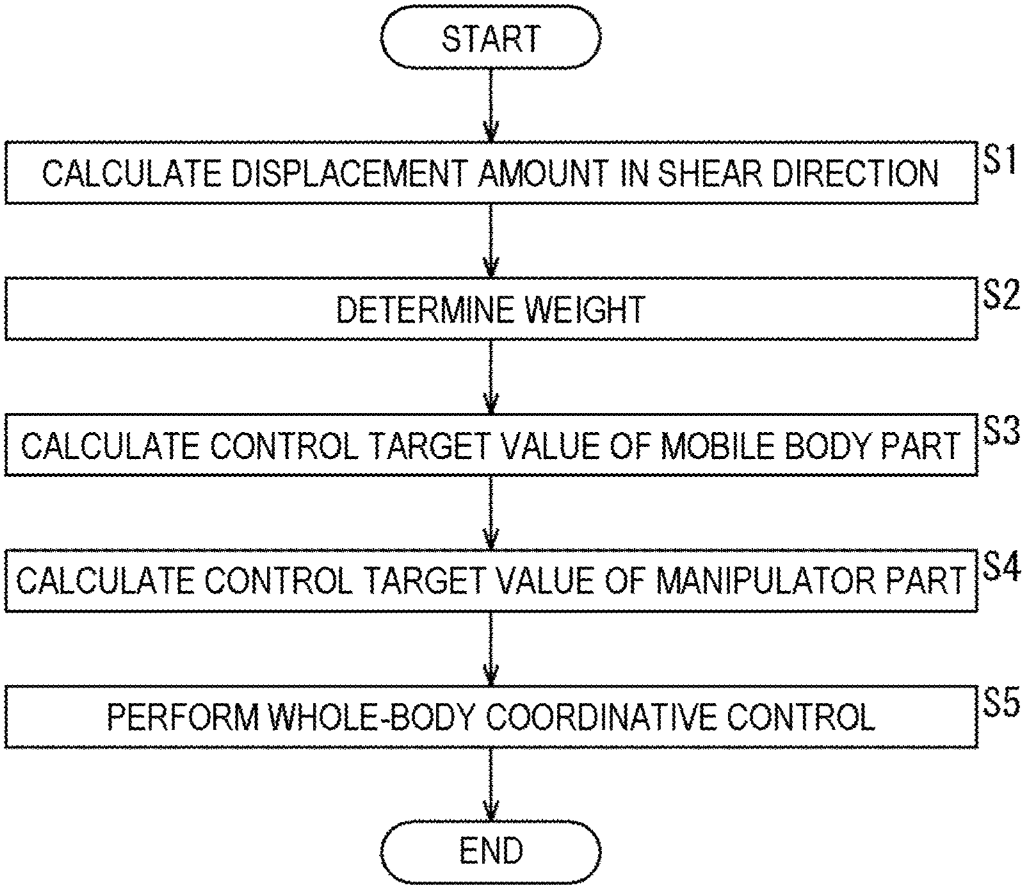
FIG. 11 is a flowchart illustrating processing executed by the robot.

Processing executed by the robot 1 will be described with reference to the flowchart in FIG. 11. The processing in FIG. 11 starts, for example, when the object is grasped by the hand part 14.

In Step S1, the slip detection unit 151 acquires a pressure distribution of a fingertip of the hand part 14 and calculates a displacement amount $u_i$ in the shear direction.

In Step S2, the weight determination unit 161 determines a weight w according to a state of surroundings of the robot 1, a state of each part of the robot 1, a state of task execution, or the like.

In Step S3, the mobile-body target value calculation unit 162 calculates a control target value $\Delta x_b$ of mobile body part 15 on the basis of the displacement amount $u_x$ and the weight w.

In Step S4, the manipulator target value calculation unit 163 calculates the control target value $\Delta x_i$ of the manipulator part 13 on the basis of the displacement amount $u_x$ and the control target value $\Delta x_b$.

In Step S5, the robot 1 performs whole-body coordinative control. For example, the mobile body control unit 153 controls the mobile body part 15 on the basis of the control target value $\Delta x_b$. Furthermore, the manipulator control unit 154 controls the manipulator part 13 on the basis of the control target value $\Delta x_i$. The hand control unit 155 controls grasping force of the hand part 14 according to the displacement amount $u_x$ in the shear direction.

With the above processing, the robot 1 can stably grasp the object.

5. Application Examples

<Change of Weight>

Determination of Weight w According to Surrounding Environment

The weight determination unit 161 determines the weight w according to a surrounding environment of the robot 1.

For example, in a case where it is recognized that the mobile body part 15 will collide with an obstacle, the weight determination unit 161 determines the weight w to be a lower value according to information of a distance with the obstacle.

By the weight w being determined to be a low value, movement of the manipulator part 13 is prioritized in the whole-body coordinative control. That is, respective movements of the manipulator part 13 and the mobile body part 15 are controlled so as to cancel the slip more by movement of the manipulator part 13, instead of by movement of the mobile body part 15.

With this arrangement, it is possible to cause the mobile body part 15 to preferentially perform movement to avoid the obstacle.

Different values may be determined as values of the weight w that defines movement in each direction of an x axis and a y axis of the mobile-body coordinate system.

Determination of Weight w According to Manipulability of Manipulator

The weight determination unit 161 determines the weight w according to manipulability of the manipulator part 13. The manipulability is an index indicating a degree of movability of each part of the manipulator part 13.

For example, in a case where there is a possibility that the manipulator part 13 will be in an unusual posture in which the manipulator part 13 is fully extended, the weight determination unit 161 determines the weight w to be a higher value.

By the weight w being determined to be a high value, movement of the mobile body part 15 is prioritized in the whole-body coordinative control. That is, respective movements of the manipulator part 13 and the mobile body part 15 are controlled so as to cancel the slip more by movement of the mobile body part 15.

With this arrangement, movement of the whole body of the robot 1 can be controlled so that the manipulator part 13 does not take an unusual posture.

Determination of Weight w According to Output from Actuator

The weight determination unit 161 determines the weight w according to output from actuators provided in the manipulator part 13 and the mobile body part 15.

For example, in a case where it is difficult for the manipulator part 13 to achieve quick movement, such as a case where output from the actuator mounted in the manipulator part 13 is low, and in a case where the grasped object is heavy, the weight determination unit 161 determines the weight w to be a higher value.

By the weight w being determined to be a high value, it is possible to cause the mobile body part 15 with high actuator output to preferentially perform movement of canceling the slip of the object.

<About Plurality of Mobile Manipulators>

A case where a plurality of robots 1 cooperatively carries one object will be described.

Figure 12:
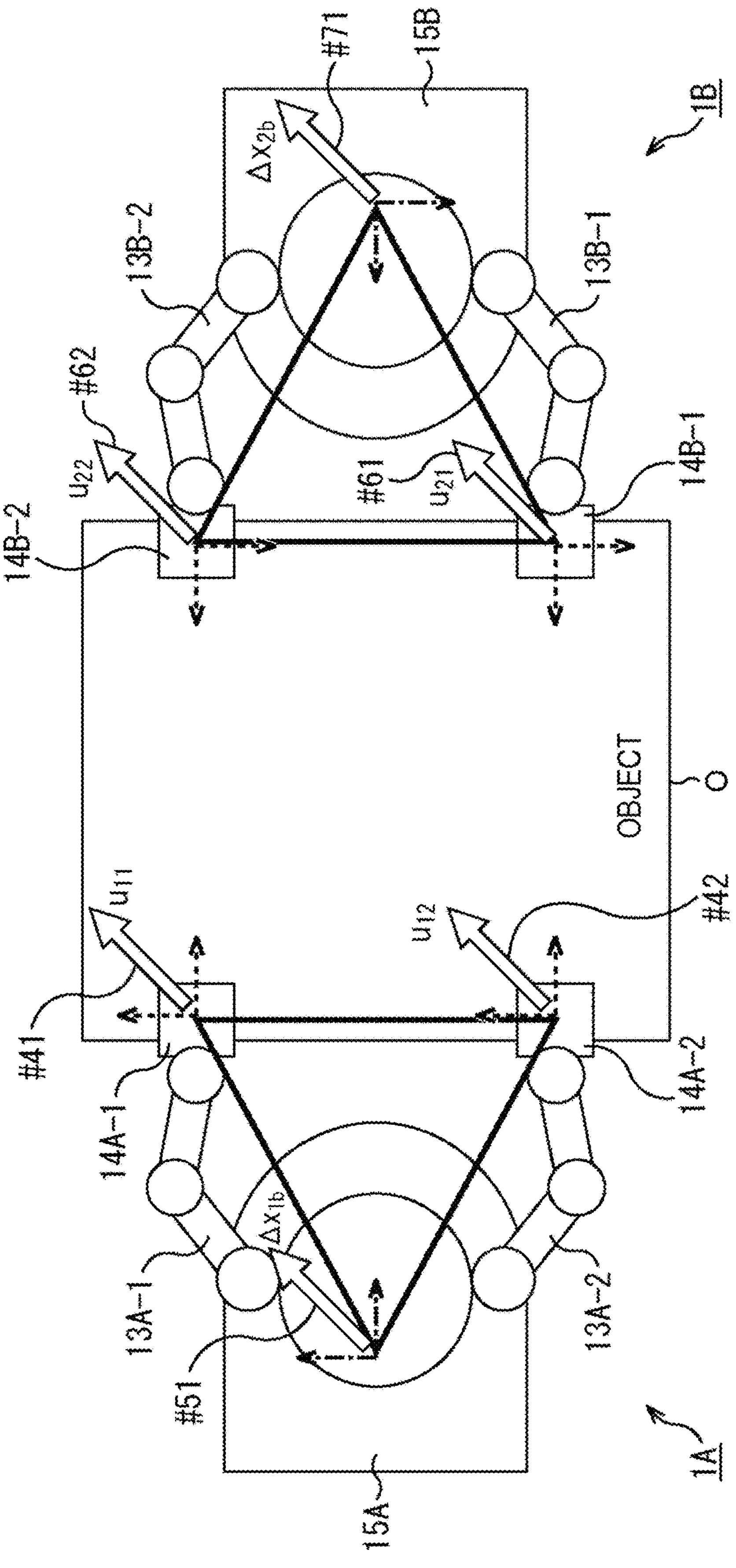
FIG. 12 is a diagram illustrating an example of whole-body coordinative control in a case where a plurality of robots cooperatively carries one object.

FIG. 12 is a diagram illustrating an example of whole-body coordinative control in a case where the plurality of robots 1 cooperatively carries one object. Description overlapping with the description of FIG. 7 will be appropriately omitted.

FIG. 12 illustrates a state where a robot 1A and a robot 1B cooperatively carry an object O. Both the robot 1A and the robot 1B have the same configuration as the configuration of the robot 1 described above. Configurations of the robot 1A and the robot 1B that correspond to the configuration of the robot 1 will be described with letters "A" and "B", respectively.

In FIG. 12, a left end of the object O is grasped by a hand part 14A-1 and hand part 14A-2 of the robot 1A, and a right end of the object O is grasped by a hand part 14B-1 and hand part 14B-2 of the robot 1B.

In a case where a slip is generated on the object O, a displacement amount $u_{11}$ is measured by a slip sensor of the hand part 14A-1 as indicated by an outlined arrow #41. Furthermore, a displacement amount $u_{12}$ is measured by a slip sensor of the hand part 14A-2 as indicated by an outlined arrow #42.

On the basis of the displacement amount $u_{11}$ and the displacement amount $u_{12}$, the robot 1A calculates a control target value $\Delta x_{1b}$ of a mobile body part 15A, a control target value of a manipulator part 13A-1, and a control target value of a manipulator part 13A-2.

As indicated by an outlined arrow #51, the robot 1A causes the mobile body part 15A to move by the control target value $\Delta x_{1b}$ so as to cancel the slip of the object O. Furthermore, in conjunction with the operation of the mobile body part 15A, the robot 1A operates each of the manipulator parts 13A-1 and 13A-2 by a control target value.

Meanwhile, a displacement amount u 21 is measured by a slip sensor of the hand part 14B-1 as indicated by an outlined arrow #61. Furthermore, a displacement amount $u_{22}$ is measured by a slip sensor of the hand part 14B-2 as indicated by an outlined arrow #62.

On the basis of the displacement amount $u_{21}$ and the displacement amount $u_{22}$, the robot 1B calculates a control target value $\Delta x_{2b}$ of a mobile body part 15B, a control target value of a manipulator part 13B-1, and a control target value of a manipulator part 13B-2.

As indicated by an outlined arrow #71, the robot 1B causes the mobile body part 15B to move by the control target value $\Delta x_{2b}$ so as to cancel the slip of the object O. Furthermore, in conjunction with the operation of the mobile body part 15B, the robot 1B operates each of the manipulator parts 13B-1 and 13B-2 by a control target value.

Figure 13:
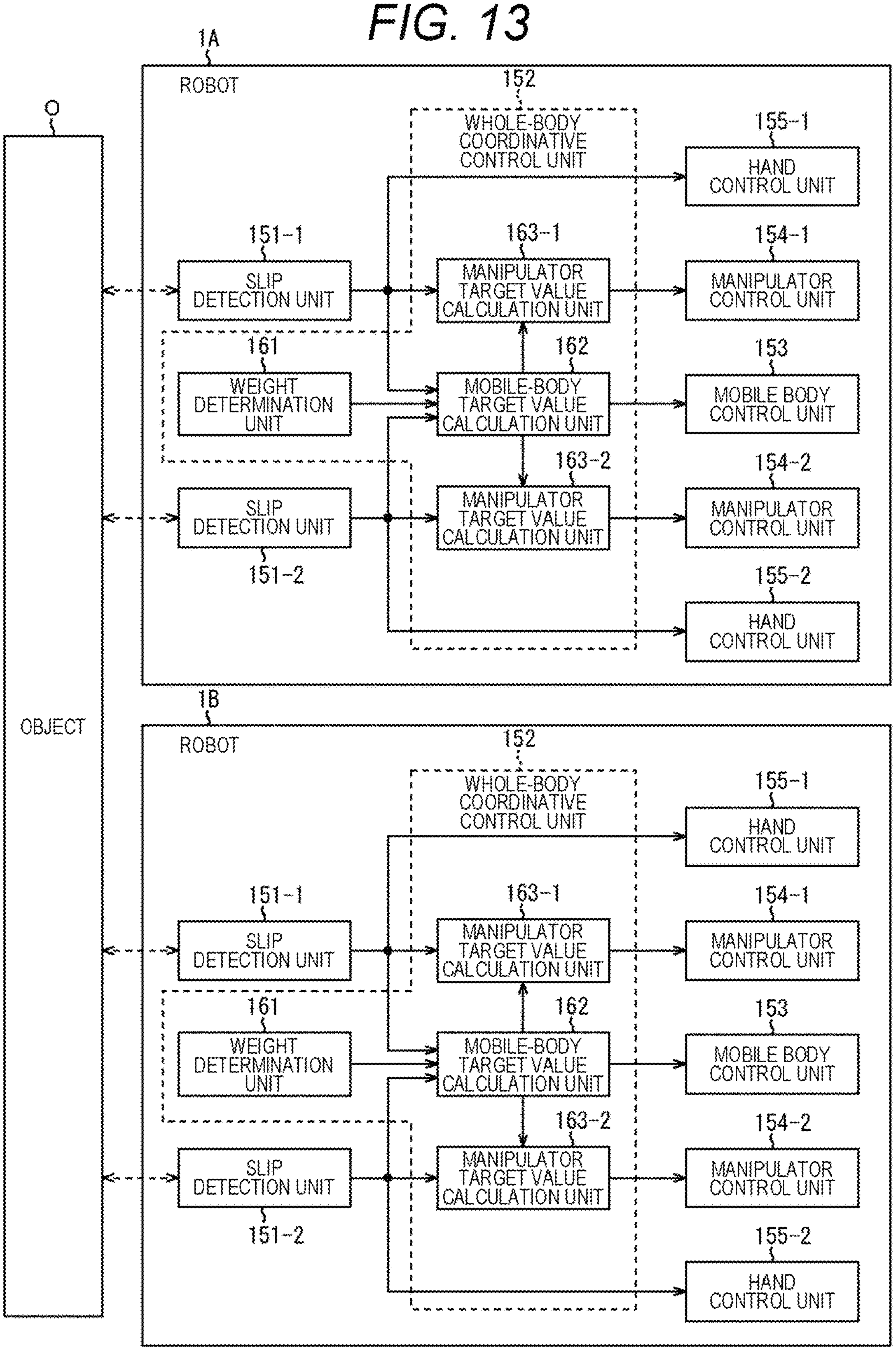
FIG. 13 is a block diagram illustrating a functional configuration example of robots in a case where the plurality of robots cooperatively carries one object.

FIG. 13 is a block diagram illustrating a functional configuration example of the robots 1 in a case where a plurality of robots 1 cooperatively carries one object.

The robot 1A and the robot 1B have the same configuration as the configuration of the robot 1 described with reference to FIG. 10. Description overlapping with the description of FIG. 10 will be appropriately omitted.

The slip detection unit 151-1 of the robot 1A acquires a pressure distribution represented by sensor data output from the pressure distribution sensor 44 provided in the hand part 14A-1, and measures a displacement amount $u_{11}$ in a shear direction on the basis of the pressure distribution.

The slip detection unit 151-2 of the robot 1A acquires a pressure distribution represented by sensor data output from the pressure distribution sensor 44 provided in the hand part 14A-2, and measures a displacement amount $u_{12}$ in a shear direction on the basis of the pressure distribution.

On the basis of information acquired by a sensor or camera provided in each part, the weight determination unit 161 of the robot 1A recognizes a state of surroundings of the robot 1A, a state of each part of the robot 1A, a state of task execution, and the like, and determines a weight w_1 according to the recognized states.

On the basis of the displacement amount $u_{11}$ measured by the slip detection unit 151-1, the displacement amount $u_{12}$ measured by the slip detection unit 151-2, and a weight w_1 determined by the weight determination unit 161, the mobile-body target value calculation unit 162 of the robot 1A calculates the control target value $\Delta x_{1b}$ of the mobile body part 15A.

On the basis of the displacement amount $u_{11}$ measured by the slip detection unit 151-1 and the control target value $\Delta x_{1b}$ calculated by the mobile-body target value calculation unit 162, the manipulator target value calculation unit 163-1 of the robot 1A calculates the control target value of the manipulator part 13A-1.

On the basis of the displacement amount $u_{12}$ measured by the slip detection unit 151-2 and the control target value $\Delta x_{1b}$ calculated by the mobile-body target value calculation unit 162, the manipulator target value calculation unit 163-2 of the robot 1A calculates the control target value of the manipulator part 13A-2.

The mobile body control unit 153 of the robot 1A controls the mobile body part 15A on the basis of the control target value $\Delta x_{1b}$ calculated by the mobile-body target value calculation unit 162.

The manipulator control unit 154-1 of the robot 1A controls the manipulator part 13A-1 on the basis of the control target value calculated by the manipulator target value calculation unit 163-1.

The hand control unit 155-1 of the robot 1A controls grasping force of the hand part 14A-1 according to the displacement amount $u_{11}$ measured by the slip detection unit 151-1.

The manipulator control unit 154-2 of the robot 1A controls the manipulator part 13A-2 on the basis of the control target value calculated by the manipulator target value calculation unit 163-2.

The hand control unit 155-2 of the robot 1A controls grasping force of the hand part 14A-2 according to the displacement amount $u_{12}$ measured by the slip detection unit 151-2.

Meanwhile, the slip detection unit 151-1 of the robot 1B acquires a pressure distribution represented by sensor data output from the pressure distribution sensor 44 provided in the hand part 14B-1, and measures a displacement amount $u_{21}$ in a shear direction on the basis of the pressure distribution.

The slip detection unit 151-2 of the robot 1B acquires a pressure distribution represented by sensor data output from the pressure distribution sensor 44 provided in the hand part 14B-2, and measures a displacement amount $u_{22}$ in the shear direction on the basis of the pressure distribution.

On the basis of information acquired by a sensor or camera provided in each part, the weight determination unit 161 of the robot 1B recognizes a state of surroundings of the robot 1B, a state of each part of the robot 1B, a state of task execution, and the like, and determines a weight w_2 according to the recognized states.

On the basis of the displacement amount $u_{21}$ measured by the slip detection unit 151-1, the displacement amount $u_{22}$ measured by the slip detection unit 151-2, and a weight w_2 determined by the weight determination unit 161, the mobile-body target value calculation unit 162 of the robot 1B calculates the control target value $\Delta x_{2b}$ of the mobile body part 15.

On the basis of the displacement amount $u_{21}$ measured by the slip detection unit 151-1 and the control target value $\Delta x_{2b}$ calculated by the mobile-body target value calculation unit 162, the manipulator target value calculation unit 163-1 of the robot 1B calculates the control target value of the manipulator part 13B-1.

On the basis of the displacement amount $u_{22}$ measured by the slip detection unit 151-2 and the control target value $\Delta x_{2b}$ calculated by the mobile-body target value calculation unit 162, the manipulator target value calculation unit 163-2 of the robot 1B calculates the control target value of the manipulator part 13B-2.

The mobile body control unit 153 of the robot 1B controls the mobile body part 15B on the basis of the control target value $\Delta x_{2b}$ calculated by the mobile-body target value calculation unit 162.

The manipulator control unit 154-1 of the robot 1B controls the manipulator part 13B-1 on the basis of the control target value calculated by the manipulator target value calculation unit 163-1.

The hand control unit 155-1 of the robot 1B controls grasping force of the hand part 14B-1 according to the displacement amount $u_{21}$ measured by the slip detection unit 151-1.

The manipulator control unit 154-2 of the robot 1B controls the manipulator part 13B-2 on the basis of the control target value calculated by the manipulator target value calculation unit 163-2.

The hand control unit 155-2 of the robot 1B controls grasping force of the hand part 14B-2 according to the displacement amount $u_{22}$ measured by the slip detection unit 151-2.

Note that distributed coordinative control may be performed in a plurality of mobile manipulators. For example, the robot 1A moves as a leader that leads work, and the robot 1B moves as a follower that assists the work. In each of the robots 1, a movement mode is changed in response to moving as the leader or the follower.

FIG. 14 is a diagram illustrating an example of movement of the leader and the follower.

As illustrated in the upper part of FIG. 14, the manipulator part 13 of the leader maintains a posture thereof, and the hand parts 14 of the leader control grasping force so that the grasped object O does not slip. The mobile body part 15 of the leader moves according to a work operation plan.

According to the whole-body coordinative control as described above, the manipulator part 13 of the follower performs a following movement using results of the measurements by the slip sensors. The hand part 14 of the follower maintains grasping force thereof. According to the whole-body coordinative control as described above, the mobile body part 15 of the follower performs a following movement using results of the measurements by the slip sensors.

As described above, the plurality of robots 1 moves differently from each other according to roles that have been set. With this arrangement, the plurality of mobile manipulators can achieve distributed coordinative control such as cooperatively conveying one object.

Because one object is cooperatively grasped by a plurality of mobile manipulators, it is possible to carry a large object or a heavy object as compared with grasping by one mobile manipulator. Simply by setting a mode to each of the mobile manipulators, it is possible to convey (coordinately convey) the object by coordinating the plurality of mobile manipulators.

<Weight Change on Plurality of Mobile Manipulators>

Even in a case where there is a plurality of mobile manipulators, it is possible to achieve various forms of coordinated conveyance while changing the weight w.

Example of Prioritizing Locus of Mobile Body

During a coordinated conveyance by the plurality of mobile manipulators, the weight determination unit 161 of each mobile manipulator (robot) determines the weight w as a lower value, for example. By the weight w being determined to be a lower value, the mobile body part 15 moves to follow a locus preset at a time of planning a route or the like. A result of measurement by the slip sensor of the hand part 14 is utilized for control of the manipulator part 13. With this arrangement, coordinated conveyance can be achieved while vibration during movement or shifting of the object is absorbed by the manipulator part 13.

Determination of Weight w According to Surrounding Environment

Even during a coordinated conveyance by the plurality of mobile manipulators, it is possible to cause the manipulator part 13 to preferentially move, by changing the weight w according to a state of a surrounding environment or the like.

As described above, in a case where one object is grasped by the plurality of robots 1, there is determined a weight w different from the weight w of a case where the object is grasped by one robot 1.

6. Modifications

Movement of grasping an object by the hand part 14 or of carrying the object grasped by the hand part 14 may be controlled on the basis of operation by a user.

In a case where one object is grasped by the plurality of robots 1, movement of one robot may be controlled by another robot.

<About System Configuration>

Figure 15:
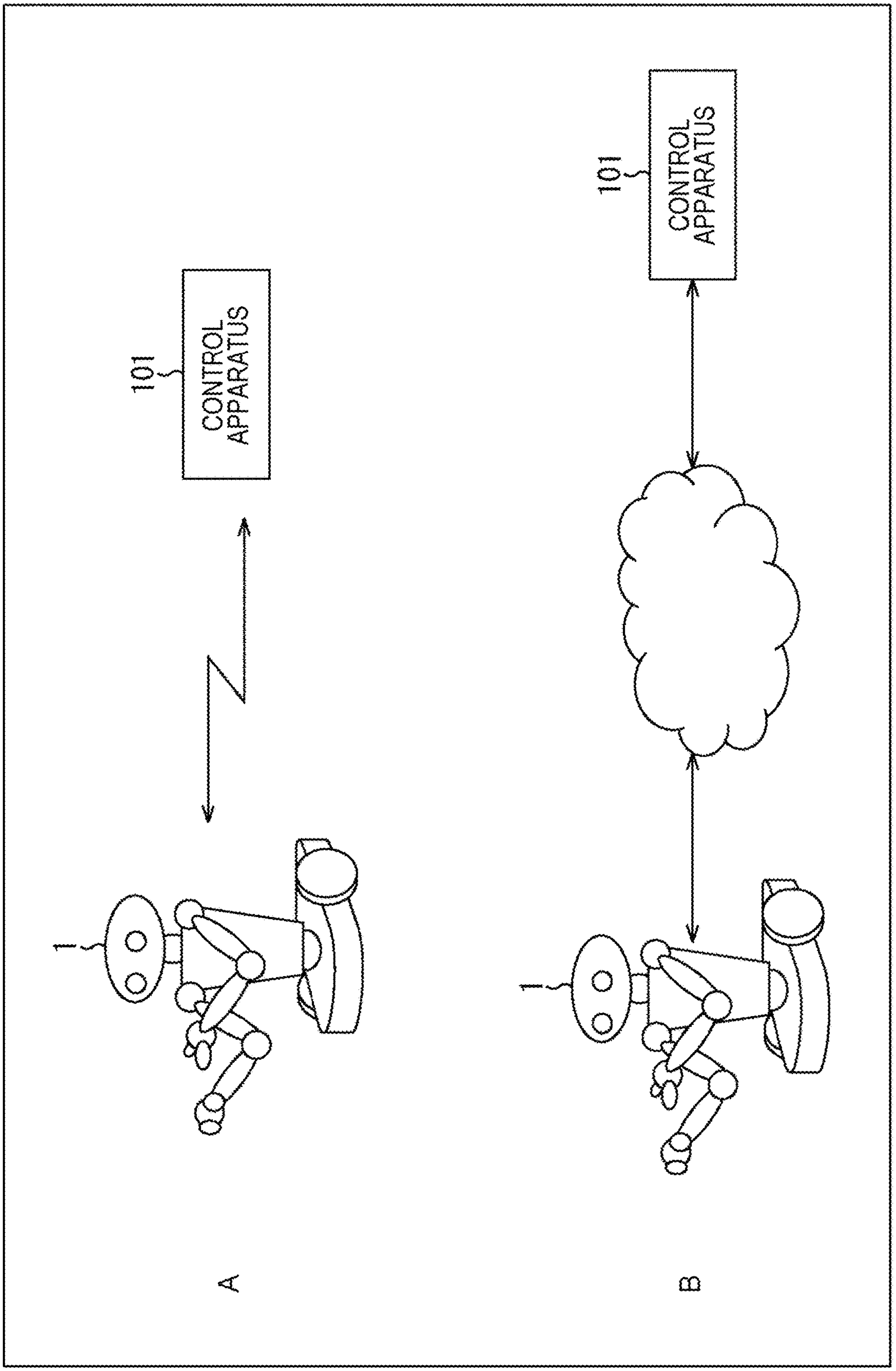
FIG. 15 is a diagram illustrating a configuration example of a control system.

FIG. 15 is a diagram illustrating a configuration example of a control system.

The control system illustrated in FIG. 15 is configured by providing the control apparatus 101 as an external apparatus of the robot 1. In this manner, the control apparatus 101 may be provided outside a housing of the robot 1.

Wireless communication utilizing a wireless LAN, wireless communication utilizing a mobile communication system, or the like is performed between the robot 1 and the control apparatus 101 in FIG. 15.

Various kinds of information such as information indicating a state of the robot 1 and information indicating a result of detection by a sensor are transmitted from the robot 1 to the control apparatus 101. Information for controlling movement of the robot 1 or the like is transmitted from the control apparatus 101 to the robot 1.

The robot 1 and the control apparatus 101 may be directly connected as illustrated in A of FIG. 15, or may be connected via a network such as the Internet as illustrated in B of FIG. 15. Movement of the plurality of robots 1 may be controlled by one control apparatus 101.

<About Computer>

The above-described series of processing can be executed by hardware or can be executed by software. In a case where the series of processing is executed by software, a program included in the software is installed from a program recording medium to a computer incorporated in dedicated hardware, a general-purpose personal computer, or the like.

Figure 16:
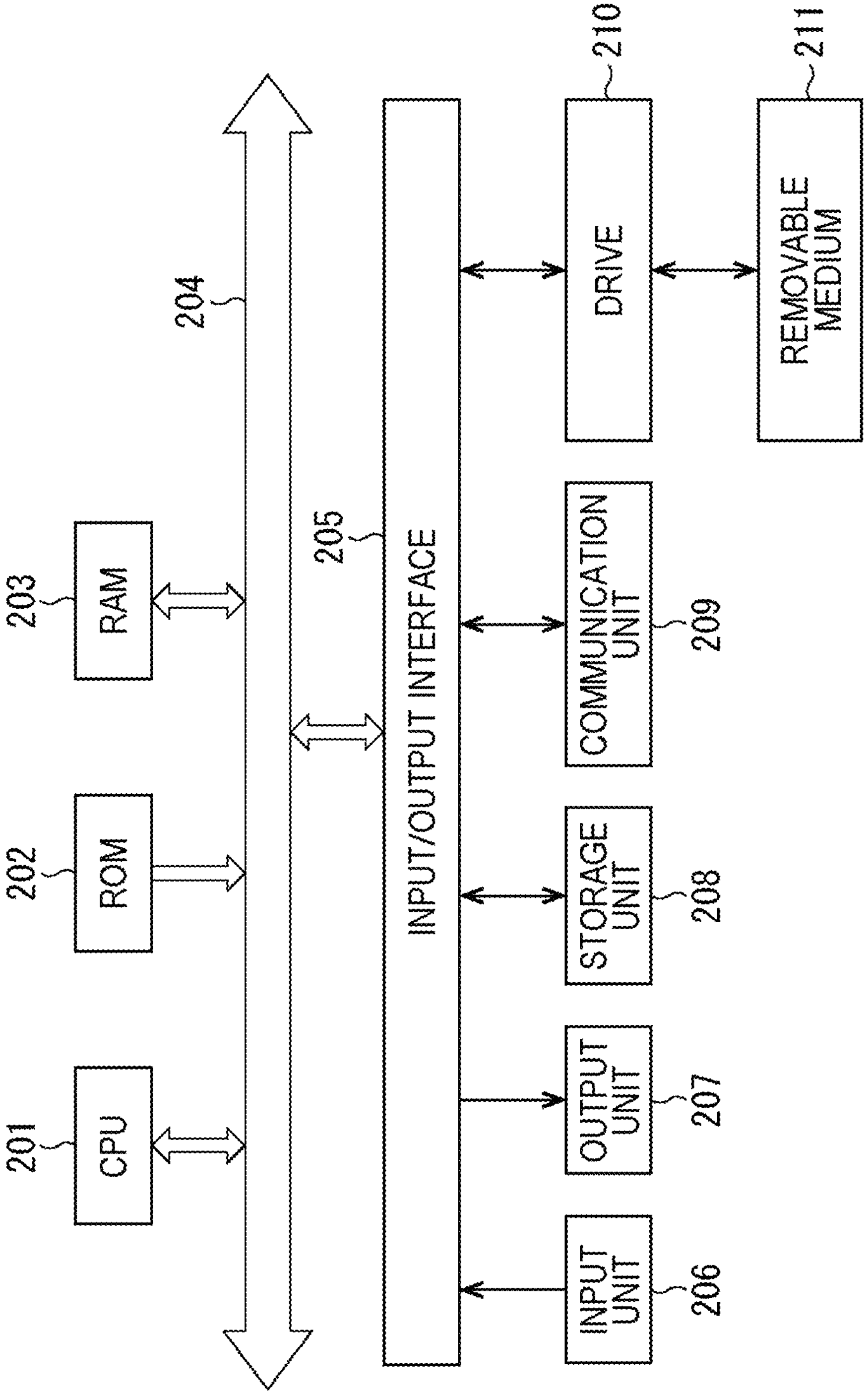
FIG. 16 is a block diagram illustrating a configuration example of hardware of a computer.

FIG. 16 is a block diagram illustrating a configuration example of hardware of a computer that executes the above-described series of processing with a program.

A central processing unit (CPU) 201, a read only memory (ROM) 202, and a random access memory (RAM) 203 are mutually connected by a bus 204.

Moreover, an input/output interface 205 is connected to the bus 204. The input/output interface 205 is connected to an input unit 206 including a keyboard, a mouse, or the like, and to an output unit 207 including a display, a speaker, or the like. Furthermore, the input/output interface 205 is connected to a storage unit 208 including a hard disk, a non-volatile memory, or the like, to a communication unit 209 including a network interface or the like, and to a drive 210 that drives a removable medium 211.

In a computer configured as above, the series of processing described above is performed by the CPU 201 loading, for example, a program stored in the storage unit 208 to the RAM 203 via the input/output interface 205 and the bus 204 and executing the program.

The program executed by the CPU 201 is provided, for example, by being recorded on the removable medium 211 or via a wired or wireless transmission medium such as a local area network, the Internet, or digital broadcasting, and is installed on the storage unit 208.

Note that, the program executed by the computer may be a program that is processed in time series in an order described in this specification, or a program that is processed in parallel or at a necessary timing such as when a call is made.

<Others>

In the present specification, the system means a set of a plurality of components (apparatuses, modules (parts), or the like) without regard to whether or not all the components are in the same housing. Therefore, a plurality of apparatuses housed in separate housings and connected via a network, and one apparatus housing a plurality of modules in one housing are both systems.

Note that the effects described herein are only examples, and the effects of the present technology are not limited to these effects. Additional effects may also be obtained.

Embodiments of the present technology are not limited to the above-described embodiments, and various changes can be made without departing from the scope of the present technology.

For example, the present technology can have a configuration of cloud computing in which one function is shared and processed jointly by a plurality of apparatuses via a network.

Furthermore, each step described in the above-described flowcharts can be executed by one apparatus, or can be executed by being shared by a plurality of apparatuses.

Moreover, in a case where a plurality of pieces of processing is included in one step, the plurality of pieces of processing included in the one step can be executed by being shared by a plurality of apparatuses, in addition to being executed by one apparatus.

Examples of Configuration Combination

The present technology can have the following configurations.

(1)

An information processing apparatus including a detection unit that detects a slip generated on an object grasped by a grasping part, and a coordinative control unit that controls, according to the slip of the object, movement of a whole body of a robot in coordination, the robot including the grasping part.

(2)

The information processing apparatus according to (1), in which the coordinative control unit controls movement of each of configurations that constitute the whole body of the robot, the configurations including at least a manipulator part to which the grasping part is attached, and a mobile mechanism of the robot.

(3)

The information processing apparatus according to (1) or (2), in which, on the basis of a control target value indicating an amount of controlling movement of each of configurations that constitute the whole body of the robot, the coordinative control unit controls movement of each of the configurations so as to cancel the slip of the object.

(4)

The information processing apparatus according to (3), in which the coordinative control unit calculates the control target value on the basis of a weight indicating a rate of the control target value of each of the configurations that constitute the whole body of the robot.

(5)

The information processing apparatus according to (4), in which the coordinative control unit calculates the control target value on the basis of the weight according to a priority indicating a degree of preferentially moving each of the configurations that constitute the whole body of the robot.

(6)

The information processing apparatus according to (4) or (5), in which the coordinative control unit determines the weight according to a surrounding environment of the robot.

(7)

The information processing apparatus according to (4) or (5), in which the coordinative control unit determines the weight according to a manipulability indicating a degree of mobility of each of the configurations that constitute the whole body of the robot.

(8)

The information processing apparatus according to (4) or (5), in which the coordinative control unit determines the weight according to output of an actuator mounted in each of the configurations of the robot.

(9)

The information processing apparatus according to (4) or (5), in which, in a case where a plurality of the robots grasps one the object, the coordinative control unit calculates the control target value on the basis of a weight different from a weight in a case where one the robot grasps the object.

(10)

The information processing apparatus according to (9), in which a plurality of the robots moves differently from each other according to roles that have been set.

(11)

The information processing apparatus according to any one of (3) to (10), in which the grasping part includes a flexible deformation layer that comes into contact with the object when grasping the object, and a pressure distribution sensor that detects distribution of pressure applied to the flexible deformation layer, and the detection unit detects a slip of the object on the basis of a result of detection by the pressure distribution sensor.

(12)

The information processing apparatus according to (2), in which the coordinative control unit controls movement of one the manipulator part on the basis of a control target value of one the manipulator part.

(13)

The information processing apparatus according to (2), in which the coordinative control unit controls movement of a plurality of the manipulator parts on the basis of a control target value of each of a plurality of the manipulator parts.

(14)

The information processing apparatus according to any one of (1) to (13), in which the coordinative control unit controls movement of each of a configurations that constitute the whole body of the robot so as to cancel the slip of the object on the basis of an amount and direction of the slip generated on the object.

(15)

An information processing method including, by an information processing apparatus, detecting a slip generated on an object grasped by a grasping part, and controlling, according to the slip of the object, movement of a whole body of a robot in coordination, the robot including the grasping part.

(16)

A program that causes a computer to execute processing of detecting a slip generated on an object grasped by a grasping part, and controlling, according to the slip of the object, movement of a whole body of a robot in coordination, the robot including the grasping part.

REFERENCE SIGNS LIST

1 Robot
11 Body part
12 Head part
13 Manipulator part
14 Hand part
15 Mobile body part
31 Base part
32 Finger part
41 Member
42 Member
43 Contact part
44 Pressure distribution sensor
51 Fingertip part
101 Control apparatus
151 Slip detection unit
152 Whole-body coordinative control unit
153 Mobile body control unit
154 Manipulator control unit
155 Hand control unit

The invention claimed is:

1. An information processing apparatus comprising:

circuitry configured to detect a slip generated on an object grasped by a robot hand of a robot;

control, according to the slip of the object, movement of a whole body of the robot in coordination by controlling a mobile body of the robot that causes the whole body of the robot to travel to a different position;

on a basis of a control target value indicating an amount of controlling movement of each of configurations that constitute the whole body of the robot, control movement of each of the configurations so as to cancel the slip of the object; and calculate the control target value on a basis of a weighting factor indicating a proportion of the control target value of each of the configurations that constitute the whole body of the robot.

2. The information processing apparatus according to claim 1, wherein the circuitry controls movement of each of configurations that constitute the whole body of the robot, the configurations including at least a manipulator part to which the robot hand is attached.

3. The information processing apparatus according to claim 1, wherein the circuitry calculates the control target value on a basis of the weighting factor according to a priority level indicating a degree of preferentially moving each of the configurations that constitute the whole body of the robot.

4. The information processing apparatus according to claim 1, wherein the circuitry determines the weighting factor according to a surrounding environment of the robot.

5. The information processing apparatus according to claim 1, wherein the circuitry determines the weighting factor according to a manipulability index indicating movability of each of the configurations that constitute the whole body of the robot.

6. The information processing apparatus according to claim 1, wherein the circuitry determines the weighting factor according to output of an actuator mounted in each of the configurations of the robot.

7. The information processing apparatus according to claim 1, wherein, in a case where a plurality of the robots grasps the object, the circuitry calculates the control target value on a basis of a second weighting factor different from a first weighting factor in a case where a single robot grasps the object.

8. The information processing apparatus according to claim 7, wherein a plurality of the robots moves differently from each other according to roles that have been set.

9. The information processing apparatus according to claim 1, wherein the robot hand includes a flexible deformation layer that comes into contact with the object when grasping the object, and a pressure distribution sensor that detects distribution of pressure applied to the flexible deformation layer, and the circuitry detects a slip of the object on a basis of a result of detection by the pressure distribution sensor.

10. The information processing apparatus according to claim 2, wherein the circuitry controls movement of the manipulator part on a basis of a control target value of the manipulator part.

11. The information processing apparatus according to claim 2, wherein the circuitry controls movement of a plurality of the manipulator parts on a basis of a control target value of each of a plurality of the manipulator parts.

12. The information processing apparatus according to claim 1, wherein the circuitry controls movement of each of configurations that constitute the whole body of the robot so as to cancel the slip of the object on a basis of an amount and direction of the slip generated on the object.

13. An information processing method comprising:

detecting, using circuitry, a slip generated on an object grasped by a robot hand of a robot;

controlling, using the circuitry, according to the slip of the object, movement of a whole body of the robot in coordination by controlling a mobile body of the robot that causes the whole body of the robot to travel to a different position;

on a basis of a control target value indicating an amount of controlling movement of each of configurations that constitute the whole body of the robot, controlling movement of each of the configurations so as to cancel the slip of the object; and calculating the control target value on a basis of a weighting factor indicating a proportion of the control target value of each of the configurations that constitute the whole body of the robot.

14. A non-transitory computer readable medium including executable instructions, which when executed by a computer cause the computer to execute an information processing method, the method comprising:

detecting a slip generated on an object grasped by a robot hand of a robot;

controlling, according to the slip of the object, movement of a whole body of the robot in coordination by controlling a mobile body of the robot that causes the whole body of the robot to travel to a different position;

on a basis of a control target value indicating an amount of controlling movement of each of configurations that constitute the whole body of the robot, controlling movement of each of the configurations so as to cancel the slip of the object; and calculating the control target value on a basis of a weighting factor indicating a proportion of the control target value of each of the configurations that constitute the whole body of the robot.

15. The information processing apparatus according to claim 1, wherein the mobile body includes a plurality of wheels, and the circuitry is configured to control rotation of the plurality of wheels to cause the whole body of the robot to travel.

16. The information processing apparatus according to claim 15, wherein the circuitry is configured to change a traveling direction of the robot by controlling a direction of the plurality of wheels.

17. The information processing apparatus according to claim 1, wherein the mobile body is provided at a lower end of a body of the robot, and supports the body.

* * * * *